(12) United States Patent
Eggert et al.

(10) Patent No.: US 8,798,849 B2
(45) Date of Patent: Aug. 5, 2014

(54) METHOD AND DEVICE FOR DUAL-CHANNEL MONITORING OF SAFETY-RELEVANT SENSOR SIGNALS

(75) Inventors: Thomas Eggert, Graz (AT); Heinz Langbauer, Lannach (AT)

(73) Assignee: MAGNA Powertrain AG & Co. KG, Lannach (AT)

( * ) Notice: Subject to any disclaimer, the term of this patent is extended or adjusted under 35 U.S.C. 154(b) by 616 days.

(21) Appl. No.: 13/058,884

(22) PCT Filed: Jul. 15, 2009

(86) PCT No.: PCT/EP2009/005151
§ 371 (c)(1),
(2), (4) Date: Apr. 25, 2011

(87) PCT Pub. No.: WO2010/022821
PCT Pub. Date: Mar. 4, 2010

(65) Prior Publication Data
US 2011/0213535 A1  Sep. 1, 2011

(30) Foreign Application Priority Data
Sep. 1, 2008 (DE) .................. 10 2008 045 265

(51) Int. Cl.
*G06F 17/00* (2006.01)
*G06F 19/00* (2011.01)
*G01M 17/00* (2006.01)

(52) U.S. Cl.
USPC ............. 701/30.3; 701/69; 701/76; 701/90; 701/92; 340/451; 340/453

(58) Field of Classification Search
USPC ............ 701/1, 36, 51, 53, 58, 60, 62, 63, 65, 701/67, 68, 69, 70, 71, 72, 76, 78, 81, 82, 701/83, 84, 87, 88, 89, 92, 29.1, 29.2, 29.7, 701/30.3; 340/425.5, 438, 451, 452, 453
See application file for complete search history.

(56) References Cited

U.S. PATENT DOCUMENTS 5,363,303 A * 11/1994 Kaneko et al. .................. 701/45
5,435,184 A *  7/1995 Pineroli et al. ................. 73/489
5,437,276 A *  8/1995 Takada .......................... 600/409

FOREIGN PATENT DOCUMENTS

DE  10 2005 005995   6/2006
EP       1 260 885   11/2002

* cited by examiner

*Primary Examiner* — Thomas Tarcza
*Assistant Examiner* — Edward Pipala
(74) *Attorney, Agent, or Firm* — Jordan IP Law, LLC; Todd A. Vaughn

(57) ABSTRACT

A method and device for dual-channel transmission of safety-relevant sensor signals. In the method, two sensor signals to be monitored are generated parallel to one another by two sensors and the generated sensor signals are transmitted to a common evaluation unit via two separate, input-side transmission channels. Within the evaluation unit, the permissibility of the transmitted sensor signals is checked using prescribed calculation specifications that correspond to one another and an evaluation unit output signal representing permissibility or impermissibility is generated for each sensor signal. The individual processing steps of the two calculation specifications are decoupled by the evaluation unit for the two sensor signals and performed diversified within the evaluation unit. The generated output signals are output via two separate, output-side transmission channels.

19 Claims, 1 Drawing Sheet

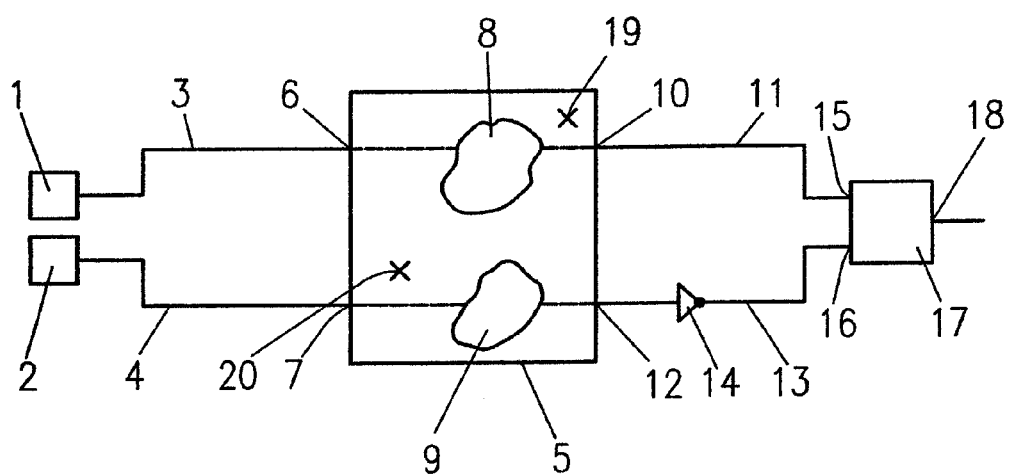

METHOD AND DEVICE FOR DUAL-CHANNEL MONITORING OF SAFETY-RELEVANT SENSOR SIGNALS

CROSS-REFERENCE TO RELATED APPLICATIONS

The present application is a National Stage Application of PCT International Application No. PCT/EP2009/005151 (filed on Jul. 15, 2009) under 35 U.S.C. §371, which claims priority to the German Patent Application No. 10 2008 045 265.3 (filed on Sep. 1, 2008), which are each hereby incorporated by reference in their respective entireties.

FIELD OF THE INVENTION

Embodiments of the present invention relate to a method and a device for dual-channel monitoring of safety-relevant sensor signals.

BACKGROUND OF THE INVENTION

Methods and devices for dual-channel monitoring of safety-relevant sensor signals can be used, for example, in monitoring the pressure of what is referred to as a torque-vectoring-system, i.e., for monitoring the hydraulic pressure acting on a friction clutch of the torque-vectoring-system. For example, the hydraulic pressure needed for actuating the two friction clutches via which the drive torque is transmitted to one of the two half-shafts of the drive axle, may not exceed a certain threshold value. If excessively high pressure is detected, then the torque-vectoring-system must be deactivated for safety reasons.

In principle, the method and devices initially specified could be used particularly in all areas in which safety-critical applications in accordance with SIL 3-Standard (Safety Integrity Level 3-Standard) are realized. Such applications are generally those that can pose danger to life and limb for humans. In addition to the specified torque-vectoring-system, additional applications in the field of passenger cars are conceivable, such as in the area of steering or braking systems, where appropriate safety-critical parameters must be monitored.

In accordance with the SIL 3-Standard, pressure monitoring in torque-vectoring-systems must for example be redundant, i.e. designed as dual channel. In monitoring systems of the prior art the pressure values to be monitored are thus processed in a completely dual-channel manner on the basis of hardware, i.e. measured separately from one another, converted into the appropriate electrical signals, checked for permissible/impermissible values and a warning/control signal is generated if one of the monitored signals is found to be at an impermissible level. This means that in systems of the prior art, both the sensors for measuring the parameters being monitored, the input-side transmission channels, the evaluation units usually designed as microprocessors and the output-side transmission channels connected thereto must each be present twice as hardware.

Redundantly furnishing evaluation units in particular constitutes a significant cost factor for this type of safety systems. Because, however, experts continue to definitively argue that two separate evaluation units are indispensable for analyzing the sensor signals being monitored, the option of allowing for cost-savings while simultaneously meeting the required safety conditions is not seen as a possibility.

SUMMARY OF THE INVENTION

In accordance with embodiments of the invention, however, a solution was unexpectedly discovered that ensures an error detection degree above 99.4% despite using only a single evaluation unit and thereby satisfies the minimum 99% error detection degree stipulated by SIL 3-standard despite using only a single evaluation unit.

In accordance with embodiments of the invention, a method is provided for dual monitoring of safety-relevant sensor signals, two sensor signals to be monitored are generated parallel to one another by way of two sensors, the generated sensor signals being transmitted via two separate input-side transmission channels to a common evaluation unit, the permissibility of the transmitted sensor signals is checked within the evaluation unit using prescribed calculation specifications that correspond to one another and an evaluation signal of the evaluation unit representing permissibility or impermissibility is generated for each sensor signal, whereby the individual processing steps of the two calculation specifications are decoupled from one another by the evaluation unit for the two sensor signals and carried out diversified within the evaluation unit and the generated output signals are output via two separate, output-side transmission channels.

In accordance with embodiments of the invention, a monitoring device is designed to carry out the inventive method and includes two sensors that are designed to generate parallel to one another the two sensor signals to be monitored, two input-side transmission channels that are designed to separately transmit the sensor signals to the common evaluation unit, whereby the evaluation unit is designed for decoupled, diversified processing of the individual processing steps of the calculation specification for the two sensor signals being monitored, and two output-side transmission channels each connected to the evaluation unit are designed for transmitting the output signals of the evaluation unit.

Therefore, in accordance with embodiments of the invention, only the parts of a monitoring system provided outside the evaluation unit are, as in the methods and devices of the prior art, designed as dual channel, i.e., each to be redundant. In contrast, in accordance with embodiments of the invention only one evaluation unit performing the evaluation is present, thereby facilitating a significant reduction in costs of a corresponding monitoring system.

In spite of this single-processor solution, the required error detection is still achieved since the sensor evaluation unit sensor signals to be monitored are separately supplied via separate transmission channels and are checked for permissibility within the evaluation unit by calculation specifications corresponding to one another, wherein the processes constituting the two calculation specifications are performed diversified within the evaluation unit. This means that each of the processing steps to be directly performed for checking the two sensor signals is performed through different calculation operations and thereby ultimately by different calculation segments of the evaluation unit.

Thus, if a transient error appears in such a calculation segment of the evaluation unit, this error can only appear as a false calculation when one of the two sensor signals is checked by the calculation specification provided for this sensor signal. Because owing to the inventive diversification, the other calculation specification, in accordance with embodiments of the invention, does not directly use the same operation and thus the same area of the evaluation unit for the second sensor signal to be checked, the currently appearing transient error has no impact on the second calculation specification. In contrast, static internal errors within the evaluation unit as well as external errors can be detected by conventional error detection methods.

In accordance with embodiments of the invention, one of the two calculation specifications is designed to be the inverse of the other calculation specification. In this way, the two calculation specifications in particular can include individual processing steps each corresponding to one another, whereby the processing step of one calculation specification is designed as the inverse of the corresponding processing step of the other calculation specification.

This inverse computation ensures the inventive diversification of the evaluation processes running inside the evaluation unit. For example, the following rules for substituting operators between the two calculation specifications may apply:

| Operator of the original calculation specification | Substitution for the inverse calculation specification | |
|---|---|---|
| & | \| | Bitwise AND-connective → bitwise OR-connective |
| \| | & | Bitwise OR-connective → bitwise AND-connective |
| ++ | -- | Increment → decrement |
| -- | ++ | Decrement → increment |
| + | - | Addition → subtraction |
| - | + | Subtraction → addition |
| && | \|\| | Logical AND-connective → logical OR-connective |
| \|\| | && | Logical OR-connective → logical AND-connective |
| < | > | Less than → greater than |
| > | < | Greater than → less than |
| <= | >= | Less than or equal to → greater than or equal to |
| >= | <= | Greater than or equal to → less than or equal to |

Assuming that the permissibility/impermissibility of the original calculation specification is checked in the one of the two sensor signals, the inverse calculation specification used for the second sensor signal can be generated using the substitution rules contained in the table presented above. Because the two calculation specifications and particularly the individual processing steps corresponding to one another of the two calculation specifications are each essentially performed parallel to one another, the result, owing to the inverse computation, is that each of the opcodes used (operation codes) of the processor employed is formulated as diversified as possible for the normal and inverse calculation specification. The result of the calculation specifications being computed parallel to one another must be complementary, while the algorithm for the computations may differ in principle. Each of the inverse values thereby constitutes the ones complement or the negative value of the particular original value used.

In accordance with embodiments of the invention, the calculation specifications are used to ascertain, for the purpose of checking the permissibility or impermissibility of the sensor signals, whether the sensor signals exceed or fall short of a prescribed reference value. This can, for example, also include cases in which permissible sensor signals may be only within one or more permissible ranges.

In accordance with embodiments of the invention, a control signal, in particular a switch-off signal, is generated if at least one output signal of the evaluation unit represents an impermissible sensor signal. In a pressure-monitoring scenario specified above, this can be the case, for example, if a maximum permissible torque of, for example, 1400 Nm is exceeded based on the ascertained pressure on the friction clutch.

Because both the input-side transmission channels and the output-side transmission channels are advantageously connected to separate inputs/outputs of the evaluation unit, the dual-channel nature outside the evaluation unit is provided by a redundant hardware design of the prior art.

The output-side transmission channels can be connected to one another via a component representing a logical OR-connective. This allows the required control signal/switch-off signal to be reliably generated as soon as one of the two calculation specifications performed within evaluation unit produces an impermissible value for the sensor signal.

BRIEF DESCRIPTION OF THE DRAWINGS

Embodiments of the invention is described in further detail below with reference being made to a single drawing.

Example FIG. 1 illustrates a highly simplified block diagram of a monitoring device, in accordance with embodiments.

DETAILED DESCRIPTION OF EMBODIMENTS

In accordance with embodiments, a monitoring device is provided that includes two sensors 1, 2, each of which is designed for measuring the same parameters to be monitored, for example, pressure on a friction clutch appearing within a torque-vectoring-system. Each of the sensors 1,2 converts the measured value into an appropriate sensor signal, each sensor being separately fed to a common evaluation unit 5 via input-side transmission channels 3, 4. For this purpose the input-side transmission channels 3, 4 are connected to separate inputs 6, 7 of the evaluation unit 5.

The evaluation unit 5, which can be designed in particular as a microprocessor, is designed for performing two calculation specifications 8, 9 corresponding to one another, where calculation specification 9 is formulated as the inverse of calculation specification 8, i.e., all individual processing steps of calculation specification 8 are substituted by corresponding inverse processing steps in the inverse calculation specification 9.

Calculation specification 8 checks the permissibility or impermissibility of the sensor signal supplied via input-side transmission channel 3 and the input 6 of the evaluation unit 5. For example, it is checked whether the sensor signal exceeds a prescribed permissible maximum value. If this maximum value is exceeded, calculation specification 8 generates a corresponding output signal that is output via an output 10 of the evaluation unit 5 and an output-side transmission channel 11.

In a corresponding manner, the inverse calculation specification 9 checks a sensor signal supplied via the input-side transmission channel 4 and the input 7 of the evaluation unit 5 for permissibility or impermissibility, the corresponding check being performed using what is referred to as inverse calculation on the basis of the inverse calculation specification 9 compared to the described check using the calculation specification 8.

In this context, the calculation specifications 8, 9 are formulated such that the respective results of the calculation specifications 8, 9 computed parallel to one another generate identical or complementary output signals when identical sensor signals are supplied.

The output signal generated by the inverse calculation specification 9 is output via a separate output 12 and an output-side transmission signal 13 connected thereto. If the calculation specifications 8, 9 are formulated such that the results of the calculation specifications 8, 9 being computed parallel to one another are complementary when identical sensor signals are supplied, then one of the issued output signals can be negated as indicated in the drawing in the form of a corresponding NOT-gate 14.

The output-side transmission signals 11, 13 are connected to the inputs 15, 16 of an OR-gate 17, at the output 18 of which a control signal is generated as a function of the output signals generated by the calculation specifications 8, 9. If, for example, an output signal "logic 1" is generated by the calculation specification 8 in the event of an impermissible sensor signal and a complementary output signal "logic 0" is generated by the inverse calculation specification 9, then the output channel 18 is set to "logic 1" as soon as one of the calculation specifications 8, 9 ascertains an impermissible sensor signal value.

The calculation specifications 8, 9 are disconnected from one another by the evaluation unit and performed diversified within the evaluation unit 5. This means that if, for example, a transient error appears in a segment 19 of the evaluation unit 5, which is directly used by the current processing step of the calculation specifications 8, the processing step of the inverse calculation specification 9 performed parallel is not affected by this error owing to the diversification, because it does not use this erroneous segment 19, but rather, for example, an error-free segment 20.

Although only a single evaluation unit 5 is thus used, the end-result of the invention is dual-channel surveillance of the values being monitored and thereby the satisfaction of prescribed safety-relevant requirements.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for dual-channel monitoring of safety-relevant sensor signals, the method comprising:
   generating two sensor signals in parallel to one another to be monitored, via two sensors;
   transmitting the generated sensor signals to a single, common microprocessor via two separate, input-side transmission channels;
   determining one of a permissibility and an impermissibility of the transmitted sensor signals within the microprocessor using two prescribed calculation specifications corresponding to one another; and then
   generating for each transmitted sensor signal, via the microprocessor, an output signal representing one of permissibility and impermissibility,
   wherein in determining the permissibility of the transmitted sensor signals, individual processing steps of the calculation specifications are decoupled from one another by the microprocessor for the sensor signals and performed separately within the microprocessor,
   wherein each generated output signal is output via two separate, output-side transmission channels.

2. The method of claim 1, wherein one of the calculation specifications is configured to be an inverse of the other calculation specification.

3. The method of claim 1, wherein the calculation specifications comprise individual processing steps each corresponding to one another such that each processing step of one calculation specification is configured as an inverse of a corresponding processing step of the other calculation specification.

4. The method of claim 1, wherein the calculation specifications are configured to be in parallel to each other.

5. The method of claim 1, wherein the calculation specifications correspond to one another and comprise individual processing steps such that each individual, corresponding processing step of the calculation specifications is performed in parallel.

6. The method of claim 1, wherein determining one of the permissibility and the impermissibility of the transmitted sensor signals using the calculation specifications comprises ascertaining whether the transmitted sensor signals one of exceed and fall short of a prescribed reference value.

7. The method of claim 1, further comprising, after generating the output signal from the microprocessor:
   generating a control signal if at least one output signal represents an impermissible signal.

8. The method of claim 7, wherein the control signal comprises a switch-off signal.

9. A monitoring device configured for dual-channel monitoring of safety-relevant sensor signals, the monitoring device comprising:
   a pair of sensors each configured to generate in parallel sensor signals to be monitored;
   a pair of input-side transmission channels configured to separately transmit the sensor signals;
   a microprocessor configured to receive the transmitted sensor signals from the input-side transmission channels and then process the transmitted sensor signals using individual processing steps to thereby determine one of a permissibility and an impermissibility of the transmitted sensor signals; and
   a pair of output-side transmission channels each operatively connected to the microprocessor and configured to generate an output signal representing one of permissibility and impermissibility.

10. The monitoring device of claim 9, wherein the input-side transmission channels are operatively connected to separate inputs of the microprocessor.

11. The monitoring device of claim 9, wherein the output-side transmission channels are operatively connected to separate outputs of the microprocessor.

12. The monitoring device of claim 9, wherein the output-side transmission channels are operatively connected to one another via a component representing a logical OR-connective.

13. A method for dual-channel monitoring hydraulic pressure acting on a friction-clutch of a torque-vectoring-system safety-relevant sensor signals, the method comprising:
   measuring the hydraulic pressure and then and converting the measured hydraulic pressure into sensor signals;
   transmitting the sensor signals to a single, common microprocessor via two separate, input-side transmission channels;
   determining one of a permissibility and an impermissibility of the transmitted sensor signals within the microprocessor using two prescribed calculation specifications which correspond to one another such by ascertaining whether the transmitted sensor signals one of exceed and fall short of a prescribed reference value; and then
   generating for each transmitted sensor signals via the microprocessor an output signal representing one of permissibility and impermissibility based on whether the transmitted sensor signals one of exceed and fall short of a prescribed reference value.

14. The method of claim 13, wherein:
one of the calculation specifications is configured to be an inverse of the other calculation specification;
in determining the permissibility of the transmitted sensor signals, individual processing steps of the calculation specifications are decoupled from one another by the microprocessor for the sensor signals and performed separately within the evaluation unit; and
each generated output signal is output via two separate, output-side transmission channels.

15. The method of claim 13, wherein the calculation specifications comprise individual processing steps each corresponding to one another such that each processing step of one calculation specification is configured as an inverse of a corresponding processing step of the other calculation specification.

16. The method of claim 13, wherein determining one of the permissibility and the impermissibility of the transmitted sensor signals using the calculation specifications comprises ascertaining whether the transmitted sensor signals one of exceed and fall short of a prescribed reference value.

17. The method of claim 13, further comprising, after generating the output signal from the microprocessor:
generating a warning signal if at least one output signal represents an impermissible signal,
wherein the warning signal comprises a switch-off signal.

18. A torque-vectoring-system with a friction clutch configured to transmit a drive torque to a half-shaft of a motor vehicle, the torque-vectoring-system comprising:
a monitoring device configured for dual-channel monitoring of hydraulic pressure acting on the friction-clutch, the monitoring device comprising:
a pair of sensors each configured to measure the hydraulic pressure and then convert the measured hydraulic pressure into sensor signals;
a pair of input-side transmission channels configured to separately transmit the sensor signals;
an evaluation unit configured to receive the transmitted sensor signals from the input-side transmission channels and then process the transmitted sensor signals using individual processing steps to thereby determine one of a permissibility and an impermissibility of the transmitted sensor signals by ascertaining whether the transmitted sensor signals one of exceed and fall short of a prescribed reference value; and
a pair of output-side transmission channels each operatively connected to the evaluation unit and configured to generate an output signal representing one of permissibility and impermissibility based upon whether the transmitted sensor signals one of exceed and fall short of a prescribed reference value,
wherein a warning signal is generated by the monitoring device if at least one output signal represents an impermissible signal.

19. The torque-vectoring-system of claim 18, wherein:
the input-side transmission channels are operatively connected to separate inputs of the evaluation unit;
the output-side transmission channels are operatively connected to separate outputs of the evaluation unit; and
the evaluation unit comprises a microprocessor.

* * * * *